United States Patent
Tsai et al.

(10) Patent No.: US 9,030,794 B2
(45) Date of Patent: May 12, 2015

(54) ELECTRONIC FUSE APPARATUS AND METHOD OF OPERATING THE SAME

(71) Applicant: Delta Electronics, Inc., Taoyuan County (TW)

(72) Inventors: Ching-Long Tsai, Taoyuan County (TW); Yi-Hsin Leu, Taoyuan County (TW); Ming-Tsung Hsieh, Taoyuan County (TW); Der-Min Liu, Taoyuan County (TW)

(73) Assignee: Delta Electronics, Inc. (TW)

( * ) Notice: Subject to any disclaimer, the term of this patent is extended or adjusted under 35 U.S.C. 154(b) by 98 days.

(21) Appl. No.: 14/049,459

(22) Filed: Oct. 9, 2013

(65) Prior Publication Data

US 2014/0285935 A1 Sep. 25, 2014

(30) Foreign Application Priority Data

Mar. 19, 2013 (TW) ............................. 102109585 A

(51) Int. Cl.
*H02H 3/00* (2006.01)
*H02H 3/10* (2006.01)
*H02H 3/087* (2006.01)

(52) U.S. Cl.
CPC ........ *H02H 3/10* (2013.01); *H02H 3/087* (2013.01)

(58) Field of Classification Search
CPC .................................................... H02H 3/006
USPC ....................................................... 361/93.2
See application file for complete search history.

(56) References Cited

U.S. PATENT DOCUMENTS

| 7,271,988 B2 * | 9/2007 | Chung et al. | ........... 361/56 |
| 7,498,864 B2 * | 3/2009 | Grover | ........... 327/525 |

* cited by examiner

*Primary Examiner* — Stephen W Jackson
(74) *Attorney, Agent, or Firm* — Lowe Hauptman & Ham, LLP

(57) ABSTRACT

An electronic fuse apparatus is connected between a power side and a system side. The electronic fuse apparatus mainly includes an electronic fuse, a short-circuit protection switch, a current-sensing module, and a digital control module. The current-sensing module detects an operating current which flows from the power side to the system side. The digital control module generates a control signal to control the electronic fuse. When the current-sensing module detects that the operating current is over-current, the digital control module generates the high-level control signal to turn off the electronic fuse, thus providing an over-current protection. When a short-circuit fault occurs at the system side, the short-circuit protection switch is turned on to turn off the electronic fuse, thus providing a short-circuit protection.

15 Claims, 6 Drawing Sheets

ELECTRONIC FUSE APPARATUS AND METHOD OF OPERATING THE SAME

BACKGROUND

1. Technical Field

The present disclosure relates generally to an electronic fuse apparatus and a method of operating the same, and more particularly to an electronic fuse apparatus with an over-current protection function and a short-circuit protection function and a method of operating the same.

2. Description of Related Art

Electronic fuses, referred to as E-fuses, are usually produced using semiconductor manufacturing processes and installed in various semiconductor devices.

With reduced size of the integrated circuits and limited manufacturing processes, it is difficult to achieve high yield and high reliability no matter the laser ablation method or the electronic ablation method.

Accordingly, it is desirable to provide an electronic fuse apparatus and a method of operating the same that the passive components are used instead of the complex integrated circuit (IC) so as to turn off an electronic fuse when the over-current condition or the short-circuit condition occurs. Accordingly, it is to provide the over-current protection and the short-circuit protection, reduce development time and costs, and provide more flexible control.

SUMMARY

An object of the present disclosure is to provide an electronic fuse apparatus to solve the above-mentioned problems. Accordingly, the electronic fuse apparatus is connected between a power side and a system side. The electronic fuse apparatus includes a soft starting module, a voltage-building-up module, an electronic fuse, a short-circuit protection switch, a current-sensing module, and a digital control module. The soft starting module receives a first voltage to soft start the electronic fuse apparatus. The voltage-building-up module is connected to the soft starting module and receives a second voltage to build up the required voltage when the electronic fuse apparatus is soft started. The electronic fuse has a first terminal, a second terminal, and a driving terminal, wherein the driving terminal is connected to the soft starting module. The short-circuit protection switch has a first terminal, a second terminal, and a driving terminal, wherein the first terminal is connected to the soft starting module, the second terminal is connected to the second terminal of the electronic fuse and the system side, and the driving terminal is connected to the voltage-building-up module. The current-sensing module is connected to the first terminal of the electronic fuse and receives the second voltage to detect an operating current flowing from the power side to the system side. The digital control module is connected to the current-sensing module, the soft starting module, and the voltage-building-up module to generate a control signal to control the electronic fuse. When the current-sensing module detects that the operating current is over-current, the digital control module generates the high-level control signal to turn off the electronic fuse to provide an over-current protection; when a short-circuit fault occurs at the system side, the short-circuit protection switch is turned on to turn off the electronic fuse to provide a short-circuit protection.

Another object of the present disclosure is to provide a method of operating an electronic fuse apparatus to solve the above-mentioned problems. Accordingly, the method includes following steps: (a) an electronic fuse and a short-circuit protection switch are provided; (b) a current-sensing module is provided to detect an operating current flowing from the power side to the system side; (c) a digital control module is provided to generate a control signal to control the electronic fuse; (d) the digital control module generates the high-level control signal to turn off the electronic fuse to provide an over-current protection when the current-sensing module detects that the operating current is over-current; and (e) the short-circuit protection switch is turned on to turn off the electronic fuse to provide a short-circuit protection when a short-circuit fault occurs at the system side.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
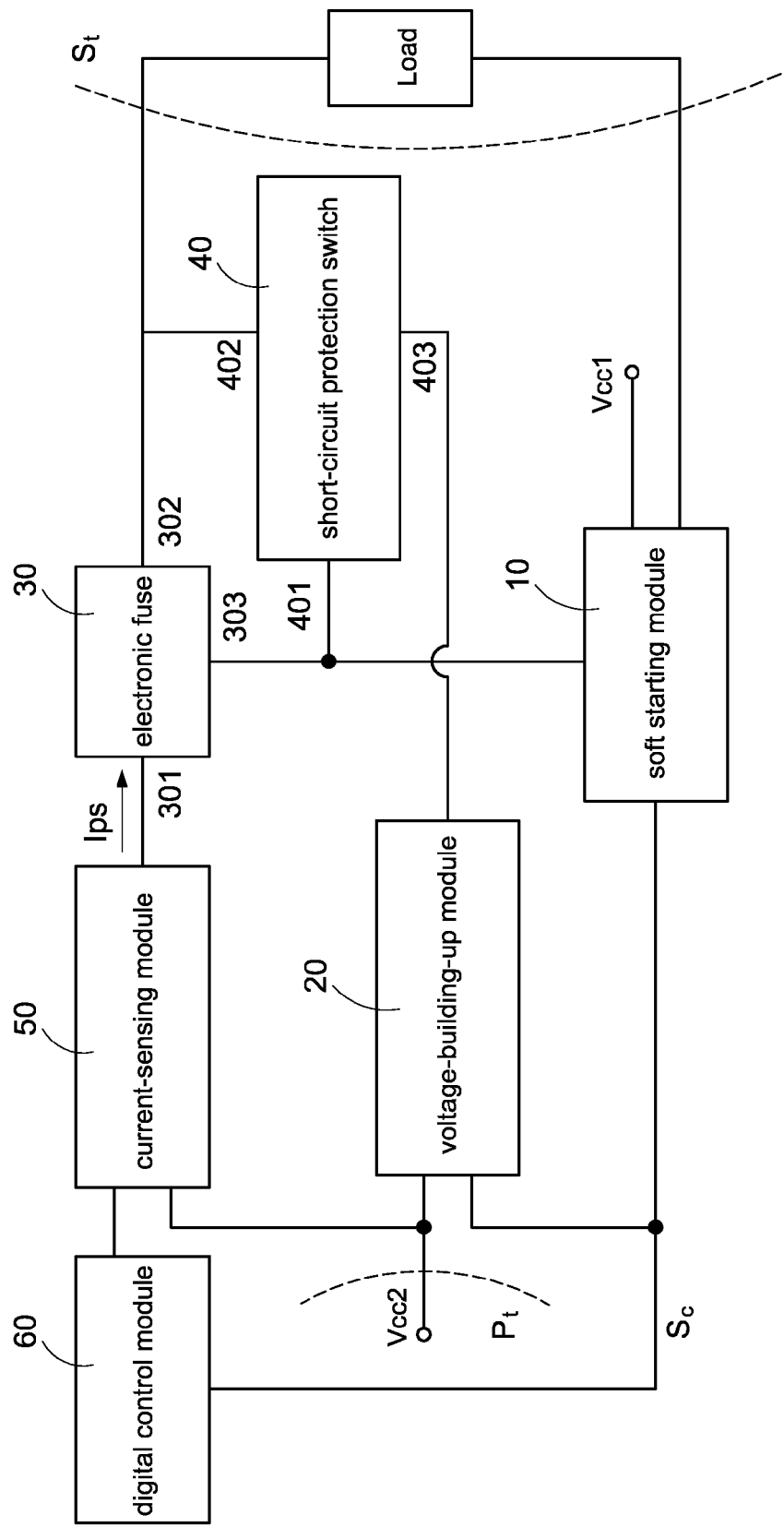
FIG. 1 is a block diagram of an electronic fuse apparatus according to the present disclosure.

Reference will now be made to the drawing figures to describe the present disclosure in detail.

Reference is made to FIG. 1 which is a block diagram of an electronic fuse apparatus according to the present disclosure. The electronic fuse apparatus is connected between a power side Pt and a system side St. The electronic fuse apparatus includes a soft starting module 10, a voltage-building-up module 20, an electronic fuse 30, a short-circuit protection switch 40, a current-sensing module 50, and a digital control module 60. The soft starting module 10 receives a first voltage Vcc1 to soft start the electronic fuse apparatus. In particular, the first voltage Vcc1 is typically 18-volt DC voltage, but not limited. The voltage-building-up module 20 is connected to the soft starting module 10 and receives a second voltage Vcc2 to build up the required voltage when the electronic fuse apparatus is soft started. In particular, the second voltage Vcc2 is typically 12-volt DC voltage, but not limited. The electronic fuse 30 has a first terminal 301, a second terminal 302, and a driving terminal 303, wherein the driving terminal 303 is connected to the soft starting module 10. The short-circuit protection switch 40 has a first terminal 401, a second terminal 402, and a driving terminal 403, wherein the first terminal 401 is connected to the soft starting module 10, the second terminal 402 is connected to the second terminal 302 of the electronic fuse 30 and the system side St, and the driving terminal 403 is connected to the voltage-building-up module 20. In particular, the short-circuit protection switch 40 can be a metal-oxide-semiconductor field-effect transistor (MOSFET). However, the embodiment is only exemplified but is not intended to limit the scope of the disclosure. In this embodiment, the n-channel MOSFET is exemplified for further demonstration and thereby the first terminal 401 is a drain, the second terminal 402 is a source, and the driving terminal 403 is a gate. The current-sensing module 50 is connected to the first terminal 301 of the electronic fuse 30 and receives the second voltage Vcc2 to detect an operating current Ips flowing from the power side Pt to the system side St. The digital control module 60 is connected to the current-sensing module 50, the soft starting module 10, and the voltage-building-up module 20 to generate a control signal Sc to control the electronic fuse 30. When the current-sensing module 50 detects that the operating current Ips is over-current, the digital control module 60 generates the high-level control signal Sc to turn off the electronic fuse 30 to provide an over-current protection. When a short-circuit fault occurs at the system side St, the short-circuit protection switch 40 is turned on to turn off the electronic fuse 30 to provide a short-circuit protection.

Figure 2:
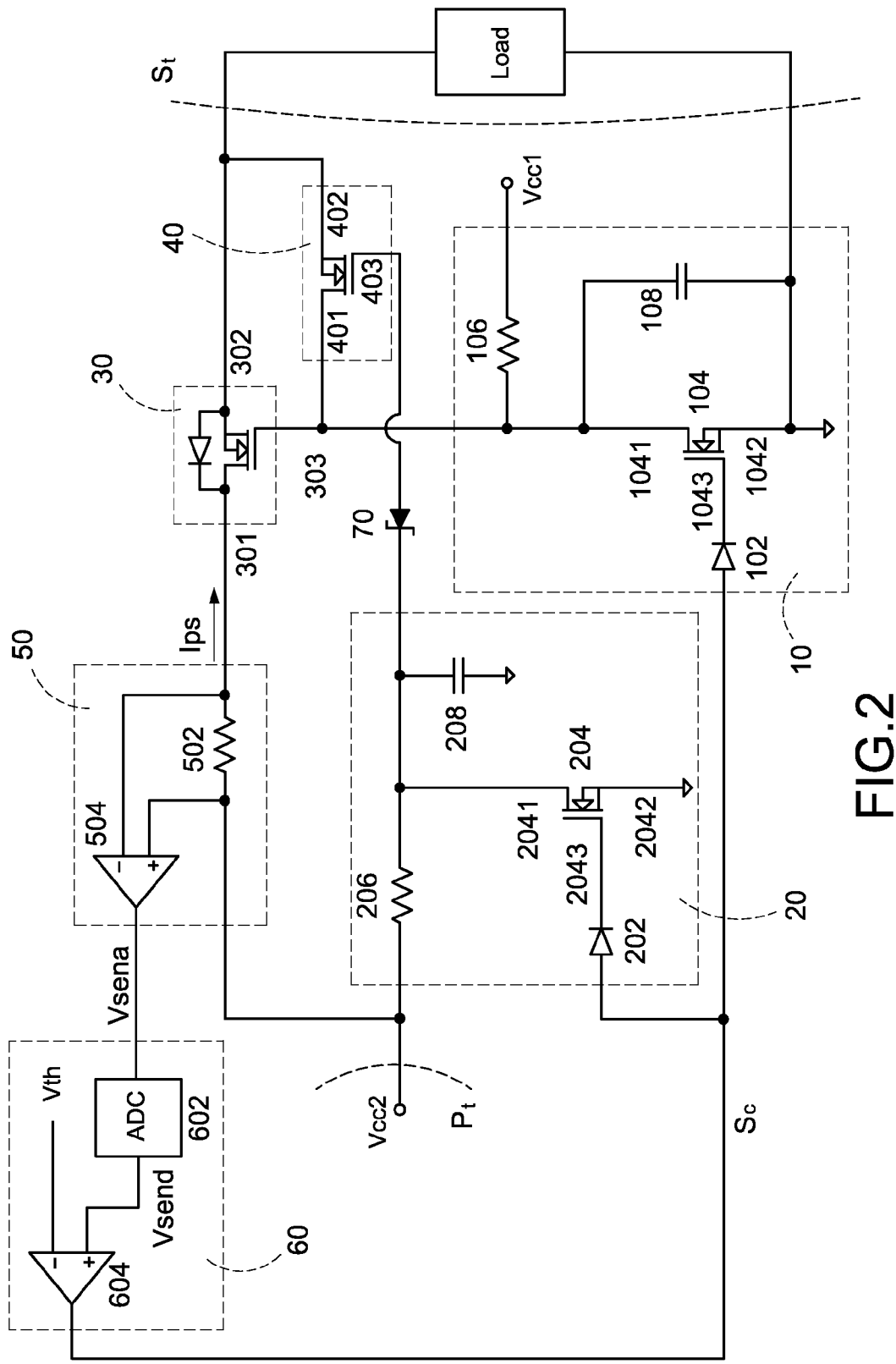
FIG. 2 is a circuit diagram of the electronic fuse apparatus according to a preferred embodiment according to the present disclosure.

Reference is made to FIG. 2 which is a circuit diagram of the electronic fuse apparatus according to a preferred embodiment according to the present disclosure. FIG. 2 shows circuit components in the block diagram of the FIG. 1. The soft starting module 10 includes a soft-starting capacitor 108, a soft-starting resistor 106, a first switch 104, and a first diode 102. The soft-starting resistor 106 is connected to the soft-starting capacitor 108 to receive the first voltage Vcc1. The first switch 104 has a first terminal 1041, a second terminal 1042, and a driving terminal 1043. The soft-starting capacitor 108 is connected to the first terminal 1041 and the second terminal 1042 of the first switch 104. The first diode 102 is connected to the driving terminal 1043 of the first switch 104 to receive the control signal Sc. The voltage-building-up module 20 includes a voltage-building-up capacitor 208, a voltage-building-up resistor 206, a second switch 204, and a second diode 202. The voltage-building-up resistor 206 is connected to the voltage-building-up capacitor 208 to receive the second voltage Vcc2. The second switch 204 has a first terminal 2041, a second terminal 2042, and a driving terminal 2043, wherein the voltage-building-up capacitor 208 is connected to the first terminal 2041 and the second terminal 2042 of the second switch 204. The second diode 202 is connected to the driving terminal 2043 of the second switch 204 to receive the control signal Sc.

The current-sensing module 50 includes a sensing resistor 502 and a sensing amplifier 504. The sensing resistor 502 has two terminals, one terminal of the sensing resistor 502 is connected to the first terminal 301 of the electronic fuse 30 and the other terminal of the sensing resistor 502 is connected to the voltage-building-up resistor 206 of the voltage-building-up module 20. The sensing amplifier 504 receives a voltage difference across the sensing resistor 502 and amplifies the voltage difference to output an analog amplified sensing voltage Vsena. In particular, the sensing amplifier 504 can be a differential amplifier. The digital control module 60 includes an analog-to-digital conversion unit 602 and a comparison unit 604. The analog-to-digital conversion unit 602 receives the analog amplified sensing voltage Vsena and converts the analog amplified sensing voltage Vsena into a digital amplified sensing voltage Vsend. The comparison unit 604 receives the digital amplified sensing voltage Vsend and a threshold voltage Vth. When the digital amplified sensing voltage Vsend is greater than the threshold voltage Vth, the comparison unit 604 generates the high-level control signal Sc. When the digital amplified sensing voltage Vsend is less than or equal to the threshold voltage Vth, the comparison unit 604 generates the low-level control signal Sc. In addition, the electronic fuse apparatus further includes a voltage-regulating unit 70. The voltage-regulating unit 70 is connected between the driving terminal 403 of the short-circuit protection switch 40 and the voltage-building-up module 20 to provide a voltage-regulating protection for the short-circuit protection switch 40. In particular, the voltage-regulating unit 70 can be a Zener diode. The detailed operation of the electronic fuse apparatus will be described hereinafter as follows.

Figure 3:
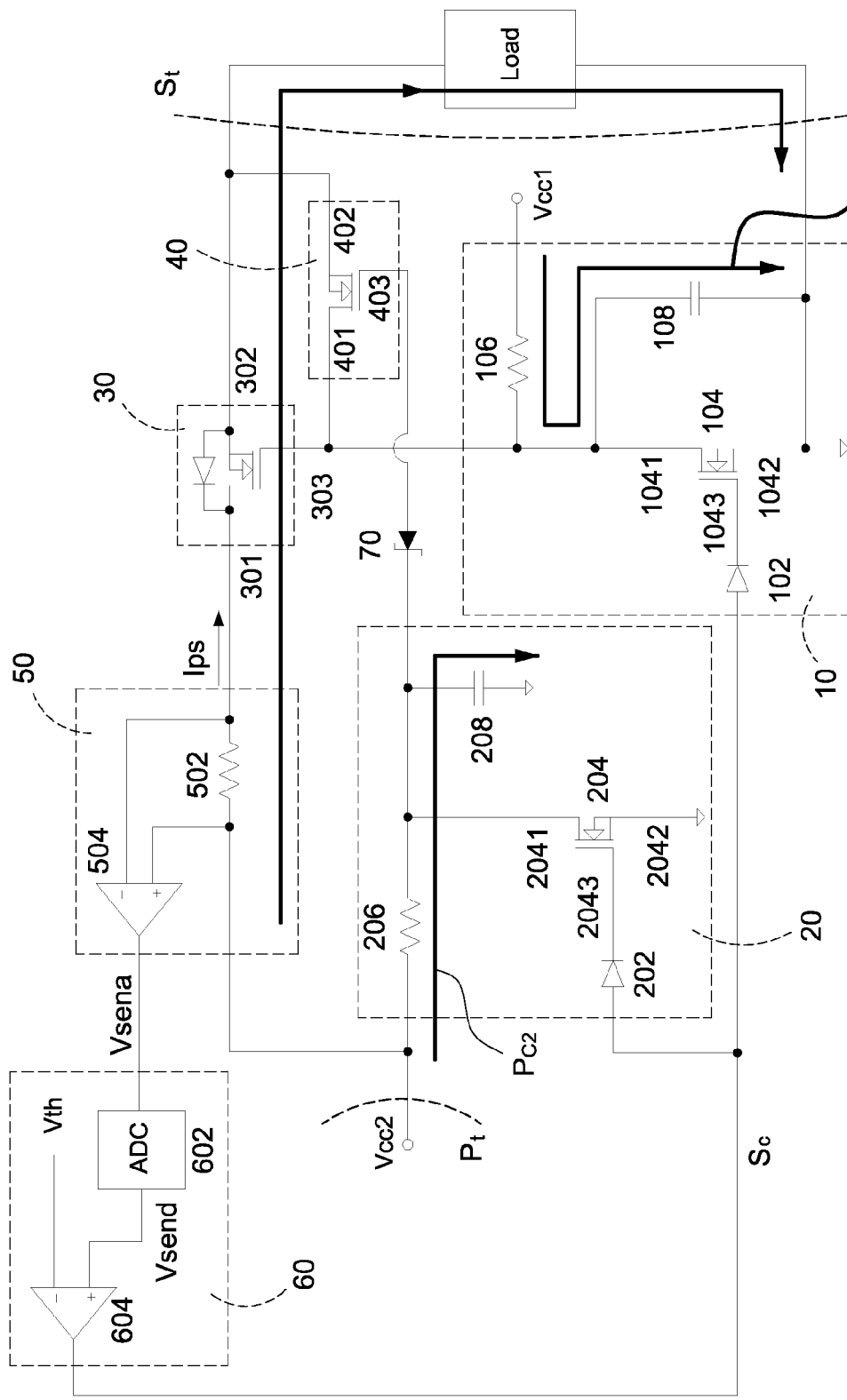
FIG. 3 is a schematic view of soft starting and voltage building-up the electronic fuse apparatus according to the present disclosure.

Reference is made to FIG. 3 which is a schematic view of soft starting and voltage building-up the electronic fuse apparatus according to the present disclosure. When the electronic fuse apparatus is powered on, the digital control module 60 generate the low-level control signal Sc so that the first switch 104 and the second switch 204 are turned off. At this time, the first voltage Vcc1 is provided to charge the soft-starting capacitor 108 via a first charging path Pc1 which is formed by the soft-starting resistor 106 and the soft-starting capacitor 108, thus soft starting the electronic fuse apparatus. When the soft-starting capacitor 108 is charged by the first voltage Vcc1, the voltage magnitude of the soft-starting capacitor 108 is gradually increased and then to turn on the electronic fuse 30. Simultaneously, the second voltage Vcc2 is provided to build up the required voltage when the electronic fuse apparatus is soft started via a second charging path Pc2 which is formed by the voltage-building-up resistor 206 and the voltage-building-up capacitor 208. In particular, the digital control module 60 can be a digital signal processor (DSP), but not limited. After the soft start operation and the voltage build-up operation are completed, the detection and protection operations are executed. When a power source (not shown) at the power side Pt is provided to supply power to a load (not shown) at the system side St, an operating current Ips flows through the current-sensing module 50 and the electronic fuse 30.

Figure 4:
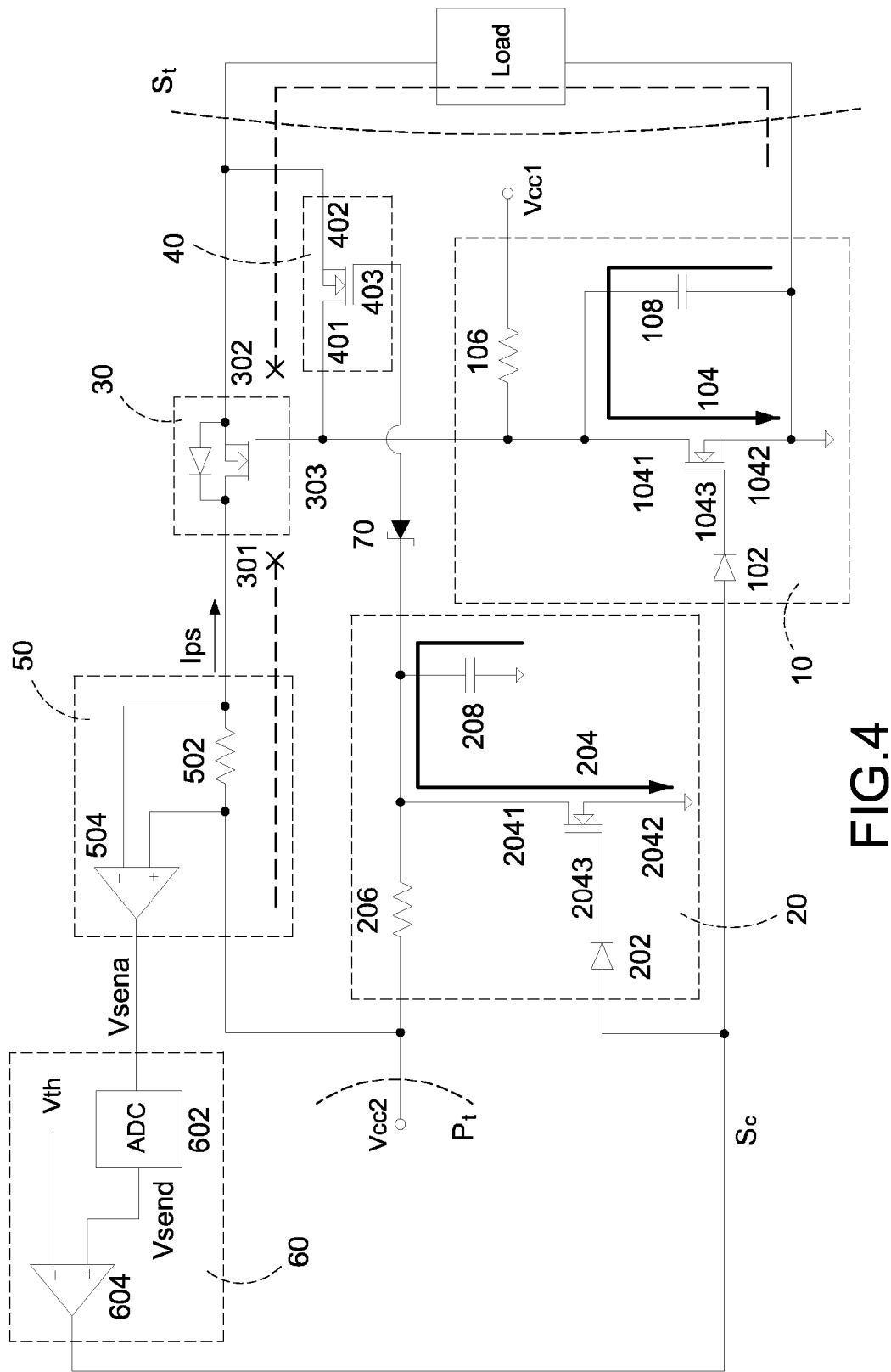
FIG. 4 is a schematic view of executing an over-current protection of the electronic fuse apparatus according to the present disclosure.

Reference is made to FIG. 4 which is a schematic view of executing an over-current protection of the electronic fuse apparatus according to the present disclosure. As mentioned above, the sensing resistor 502 of the current-sensing module 50 detects the current magnitude of the operating current Ips and then a voltage difference across the sensing resistor 502 is produced. The sensing amplifier 504 amplifies the voltage difference to output the analog amplified sensing voltage Vsena. Afterward, the analog-to-digital conversion unit 602 receives the analog amplified sensing voltage Vsena and converts the analog amplified sensing voltage Vsena into the digital amplified sensing voltage Vsend. Afterward, the comparison unit 604 receives the digital amplified sensing voltage Vsend and compares the digital amplified sensing voltage Vsend to the threshold voltage Vth.

When the operating current Ips flowing through the sensing resistor 502 is normal, that is the digital amplified sensing voltage Vsend is less than or equal to the threshold voltage Vth, the comparison unit 604 generates the low-level control signal Sc, the first switch 104 and the second switch 204 are still turned off. At this time, the power source at the power side Pt normally supplies power to the load at the system side St. When the operating current Ips flowing through the sensing resistor 502 is over-current, that is the digital amplified sensing voltage Vsend is greater than the threshold voltage Vth, the comparison unit 604 generates the high-level control signal Sc, the first switch 104 and the second switch 204 are turned on. As shown in FIG. 4, because the first switch 104 and the second switch 204 are turned on, the soft-starting capacitor 108 and the voltage-building-up capacitor 208 are discharged via the first switch 104 and the second switch 204, respectively. When the soft-starting capacitor 108 is discharged, the voltage magnitude of the soft-starting capacitor 108 is gradually decreased and then to turn off the electronic fuse 30. Accordingly, the power source at the power side Pt is disconnected to stop supplying power to the load at the system side St so as to provide the over-current protection.

Especially, the above-mentioned over-current protection is one of the embodiments of the present disclosure. Also, another broader current protection is a current-limiting protection. That is, when the operating current Ips is greater than a current value which is set according to the threshold voltage, the comparison unit 604 generates the high-level control signal Sc to switch the first switch 104 and the second switch 204 are at the turned-on conditions so that the electronic fuse 30 is turned off to disconnect the power source at the power side Pt to stop supplying power to the load at the system side St so as to provide the over-current protection. In addition, because the over-current condition could occur due to the transient errors, the digital control module 60 further judges the duration and magnitude of the relationship between the digital amplified sensing voltage Vsend and the threshold voltage Vth so as to confirm whether the over-current condition or the current-limiting condition truly occurs. In other words, the over-current protection or the current-limiting protection does not be executed when the digital control module 60 judges that the over-current condition or the current-limiting condition occurs due to the transient errors. On the contrary, the over-current protection or the current-limiting protection is executed when the digital control module 60 judges that the over-current condition or the current-limiting condition truly occurs not because of the transient errors.

Figure 5:
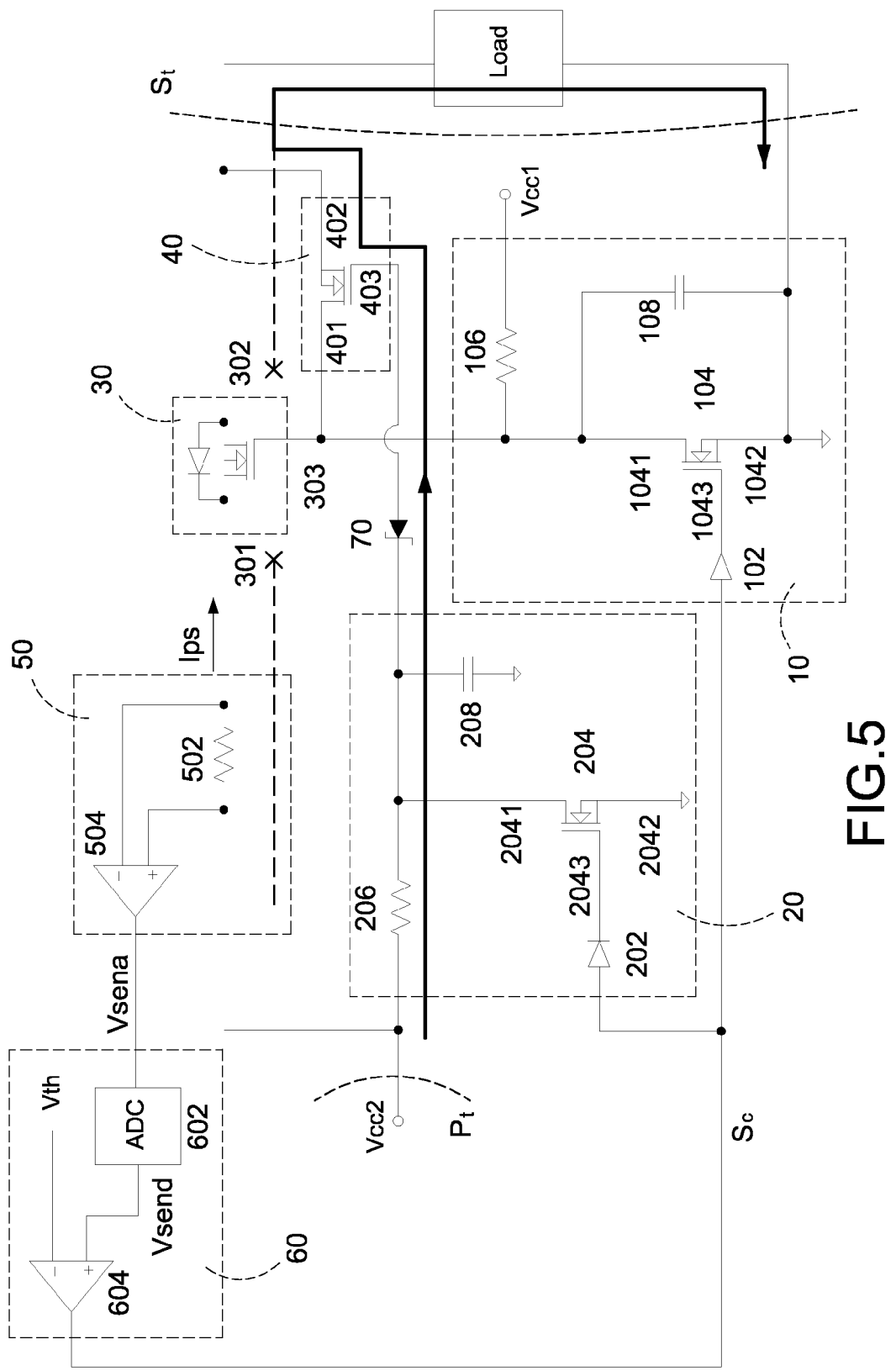
FIG. 5 is a schematic view of executing a short-circuit protection of the electronic fuse apparatus according to the present disclosure.

Reference is made to FIG. 5 which is a schematic view of executing a short-circuit protection of the electronic fuse apparatus according to the present disclosure. As mentioned above, after the soft start operation and the voltage build-up operation are completed, the detection and protection operations are executed. When a short-circuit fault occurs at the system side St, the voltage-regulating unit 70, namely the Zener diode, is conductive in a reverse biased conduction because of the reversed-biased voltage between the voltage of the voltage-building-up capacitor 208 and the grounding voltage of the system side St so that the short-circuit protection switch 40 is turned on. When the short-circuit protection switch 40 is turned on, a voltage difference between the second terminal 302 (namely the source) and the driving terminal 3030 (namely the gate) of the electronic fuse 30 is zero, namely the gate-source voltage of the electronic fuse 30 is zero so that the electronic fuse 30 is turned off to provide the short-circuit isolation protection. Especially, because the short-circuit fault significantly impact the devices and components in the whole system, the short-circuit protection switch 40 is used to quickly and effectively provide the short-circuit isolation protection by its inherent characteristics. On the contrary, if the digital control module 60 detects that the short-circuit fault occurs at the system side St, it needs to take longer time to communicate, calculate, and deal with the short-circuit fault until the short-circuit fault is removed. Accordingly, the inherent characteristics of the short-circuit protection switch 40 is provided to quickly and effectively execute the short-circuit isolation protection without using the digital control module 60.

Figure 6:
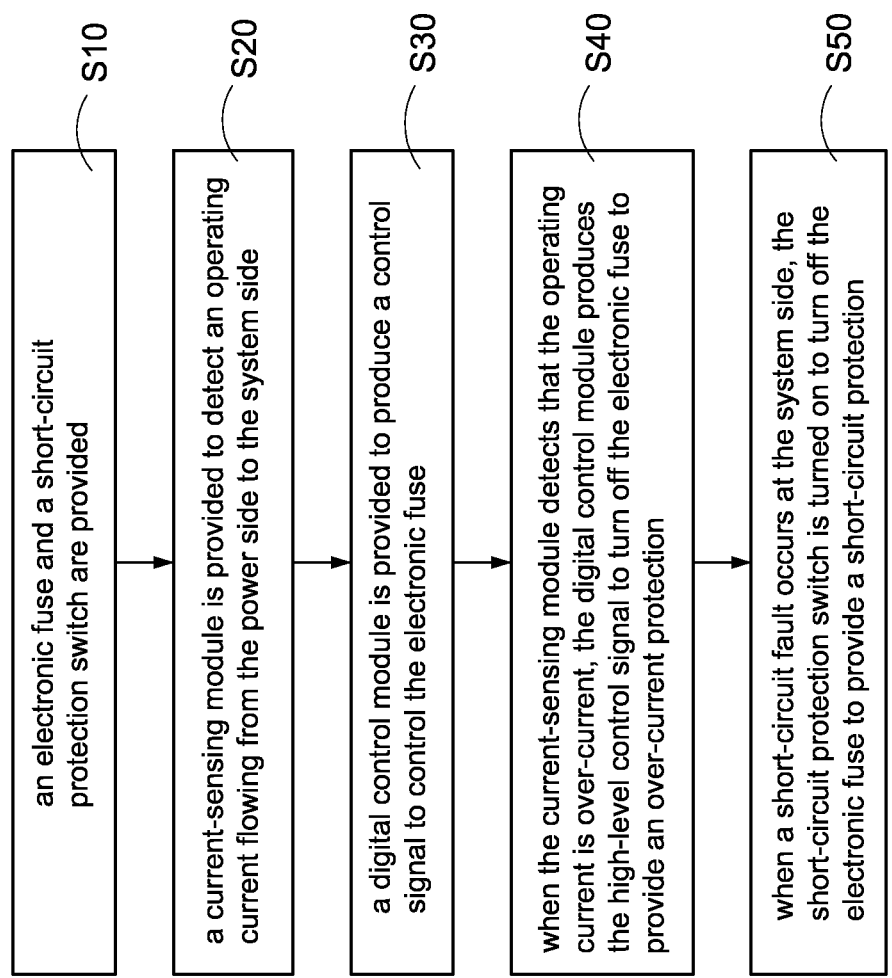
FIG. 6 is a flowchart of a method of operating an electronic fuse apparatus according to the present disclosure.

Reference is made to FIG. 6 which is a flowchart of a method of operating an electronic fuse apparatus according to the present disclosure. The electronic fuse apparatus is connected between a power side and a system side. The method includes following steps: First, an electronic fuse and a short-circuit protection switch are provided (S10). In particular, the short-circuit protection switch 40 can be a metal-oxide-semiconductor field-effect transistor (MOSFET). Especially, before the step (S10), a soft starting module and a voltage-building-up module are provided. The soft starting module receives a first voltage to soft start the electronic fuse apparatus. The voltage-building-up module receives a second voltage to build up the required voltage when the electronic fuse apparatus is soft started. The soft starting module includes a soft-starting capacitor, a soft-starting resistor, a first switch, and a first diode. The soft-starting resistor is connected to the soft-starting capacitor to receive the first voltage. The first switch has a first terminal, a second terminal, and a driving terminal. The soft-starting capacitor is connected to the first terminal and the second terminal of the first switch. The first diode is connected to the driving terminal of the first switch to receive the control signal. The voltage-building-up module includes a voltage-building-up capacitor, a voltage-building-up resistor, a second switch, and a second diode. The voltage-building-up resistor is connected to the voltage-building-up capacitor to receive the second voltage. The second switch has a first terminal, a second terminal, and a driving terminal, wherein the voltage-building-up capacitor is connected to the first terminal and the second terminal of the second switch. The second diode is connected to the driving terminal of the second switch to receive the control signal.

Afterward, a current-sensing module is provided to detect an operating current flowing from the power side to the system side (S20). The current-sensing module includes a sensing resistor and a sensing amplifier. The sensing resistor has two terminals, one terminal of the sensing resistor is connected to the first terminal of the electronic fuse and the other terminal of the sensing resistor is connected to the voltage-building-up resistor of the voltage-building-up module. The sensing amplifier receives a voltage difference across the sensing resistor and amplifies the voltage difference to output an analog amplified sensing voltage. Afterward, a digital control module is provided to generate a control signal to control the electronic fuse (S30). As mentioned above, the digital control module generates the low-level control signal to execute the soft start operation and the voltage build-up operation. More specifically, when the electronic fuse apparatus is powered on, the digital control module generates the low-level control signal to turn off the first switch and the second switch. The first voltage is provided to charge the soft-starting capacitor via a first charging path which is formed by the soft-starting resistor and the soft-starting capacitor, thus soft starting the electronic fuse apparatus. The second voltage is provided to build up the required voltage when the electronic fuse apparatus is soft started via a second charging path which is formed by the voltage-building-up resistor and the voltage-building-up capacitor. The digital control module includes an analog-to-digital conversion unit and a comparison unit. The analog-to-digital conversion unit receives the analog amplified sensing voltage and converts the analog amplified sensing voltage into a digital amplified sensing voltage. The comparison unit receives the digital amplified sensing voltage and a threshold voltage. When the digital amplified sensing voltage is greater than the threshold voltage, the comparison unit generates the high-level control signal. When the digital amplified sensing voltage is less than or equal to the threshold voltage, the comparison unit generates the low-level control signal.

When the current-sensing module detects that the operating current is over-current, the digital control module generates the high-level control signal to turn off the electronic fuse to provide an over-current protection (S40). More specifically, when the operating current flowing through the sensing resistor is over-current, the digital amplified sensing voltage is greater than the threshold voltage. Accordingly, the comparison unit generates the high-level control signal to turn on the first switch and the second switch to turn off the electronic fuse, thus providing the over-current protection.

When a short-circuit fault occurs at the system side, the short-circuit protection switch is turned on to turn off the electronic fuse to provide a short-circuit protection (S50). Especially, the method of operating the electronic fuse apparatus further includes a step: a voltage-regulating unit is provided. The voltage-regulating unit is connected between the driving terminal of the short-circuit protection switch and the voltage-building-up module to provide a voltage-regulating protection for the short-circuit protection switch. When the short-circuit fault occurs at the system side, the voltage-regulation unit is conductive in a reverse biased conduction to turn off the electronic fuse, thus providing a short-circuit isolation protection.

In conclusion, the present disclosure has following advantages:

1. The passive components are used instead of the complex integrated circuit (IC) to reduce development time and costs, and provide more flexible control;

2. The electronic fuse apparatus and the method of operating the same provide both functions of an over-current protection (including a current-limiting protection) and a short-circuit protection;

3. The digital control module 60 is implemented by the digital signal processor (DSP) to provide more accurate and more flexible controls of the over-current protection; and 4. The inherent characteristics of the switch components are utilized to provide rapid and real-time short-circuit protection, thus reducing damages caused by the short-circuit fault.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An electronic fuse apparatus connected between a power side and a system side, the electronic fuse apparatus comprising:
   a soft starting module configured to receive a first voltage to soft start the electronic fuse apparatus;
   a voltage-building-up module connected to the soft starting module and configured to receive a second voltage to build up the required voltage when the electronic fuse apparatus is soft started;
   an electronic fuse having a first terminal, a second terminal, and a driving terminal, wherein the driving terminal is connected to the soft starting module;
   a short-circuit protection switch having a first terminal, a second terminal, and a driving terminal, wherein the first terminal is connected to the soft starting module, the second terminal is connected to the second terminal of the electronic fuse and the system side, and the driving terminal is connected to the voltage-building-up module;
   a current-sensing module connected to the first terminal of the electronic fuse and configured to receive the second voltage to detect an operating current flowing from the power side to the system side; and
   a digital control module connected to the current-sensing module, the soft starting module, and the voltage-building-up module and configured to generate a control signal to control the electronic fuse;
   wherein when the current-sensing module detects that the operating current is over-current, the digital control module generates the high-level control signal to turn off the electronic fuse to provide an over-current protection; when a short-circuit fault occurs at the system side, the short-circuit protection switch is turned on to turn off the electronic fuse to provide a short-circuit protection.

2. The electronic fuse apparatus in claim 1, wherein
the soft starting module comprises:
a soft-starting capacitor;
a soft-starting resistor connected to the soft-starting capacitor to receive the first voltage;
a first switch having a first terminal, a second terminal, and a driving terminal, wherein the soft-starting capacitor is connected to the first terminal and the second terminal of the first switch; and
a first diode connected to the driving terminal of the first switch to receive the control signal;
the voltage-building-up module comprises:
a voltage-building-up capacitor;
a voltage-building-up resistor connected to the voltage-building-up capacitor to receive the second voltage;
a second switch having a first terminal, a second terminal, and a driving terminal, wherein the voltage-building-up capacitor is connected to the first terminal and the second terminal of the second switch; and
a second diode connected to the driving terminal of the second switch to receive the control signal;
the current-sensing module comprises:
a sensing resistor having two terminals, one terminal of the sensing resistor connected to the first terminal of the electronic fuse and the other terminal of the sensing resistor connected to the voltage-building-up resistor of the voltage-building-up module; and
a sensing amplifier configured to receive a voltage difference across the sensing resistor and amplify the voltage difference to output an analog amplified sensing voltage; and
the digital control module comprises:
an analog-to-digital conversion unit configured to receive the analog amplified sensing voltage and convert the analog amplified sensing voltage into a digital amplified sensing voltage; and
a comparison unit configured to receive the digital amplified sensing voltage and a threshold voltage, wherein when the digital amplified sensing voltage is greater than the threshold voltage, the comparison unit is configured to generate the high-level control signal; when the digital amplified sensing voltage is less than or equal to the threshold voltage, the comparison unit is configured to generate the low-level control signal.

3. The electronic fuse apparatus in claim 1, wherein when the electronic fuse apparatus is started, the digital control module is configured to generate the low-level control signal to execute the soft start operation and the voltage build-up operation.

4. The electronic fuse apparatus in claim 2, wherein when the electronic fuse apparatus is started, the digital control module is configured to generate the low-level control signal to turn off the first switch and the second switch; the first voltage is configured to charge the soft-starting capacitor via a first charging path formed by the soft-starting resistor and the soft-starting capacitor so as to soft start the electronic fuse apparatus; the second voltage is configured to build up the required voltage when the electronic fuse apparatus is soft started via a second charging path formed by the voltage-building-up resistor and the voltage-building-up capacitor.

5. The electronic fuse apparatus in claim 2, wherein when the operating current is over-current, the digital amplified sensing voltage is greater than the threshold voltage so that the comparison unit is configured to generate the high-level control signal to turn on the first switch and the second switch, thus turning off the electronic fuse to provide the over-current protection.

6. The electronic fuse apparatus in claim 2, further comprising:
a voltage-regulating unit connected between the driving terminal of the short-circuit protection switch and the voltage-building-up module to provide a voltage-regulating protection for the short-circuit protection switch.

7. The electronic fuse apparatus in claim 6, wherein when the short-circuit fault occurs at the system side, the voltage-regulation unit is conductive in a reverse biased conduction to turn off the electronic fuse, thus providing a short-circuit isolation protection.

8. A method of operating an electronic fuse apparatus, the electronic fuse apparatus connected between a power side and a system side, steps of the method comprising:
(a) providing an electronic fuse and a short-circuit protection switch;
(b) providing a current-sensing module to detect an operating current flowing from the power side to the system side;
(c) providing a digital control module to generate a control signal to control the electronic fuse;
(d) generating the high-level control signal by the digital control module to turn off the electronic fuse to provide an over-current protection when the current-sensing module detects that the operating current is over-current; and
(e) turning on the short-circuit protection switch to turn off the electronic fuse to provide a short-circuit protection when a short-circuit fault occurs at the system side.

9. The method of operating the electronic fuse apparatus in claim 8, wherein before the step (a) further comprising:
(a1) providing a soft starting module to receive a first voltage to soft start the electronic fuse apparatus; and
(a2) providing a voltage-building-up module to receive a second voltage to build up the required voltage when the electronic fuse apparatus is soft started.

10. The method of operating the electronic fuse apparatus in claim 9, wherein
the soft starting module comprises:
a soft-starting capacitor;
a soft-starting resistor connected to the soft-starting capacitor to receive the first voltage;
a first switch having a first terminal, a second terminal, and a driving terminal, wherein the soft-starting capacitor is connected to the first terminal and the second terminal of the first switch; and
a first diode connected to the driving terminal of the first switch to receive the control signal;

the voltage-building-up module comprises:
a voltage-building-up capacitor;
a voltage-building-up resistor connected to the voltage-building-up capacitor to receive the second voltage;
a second switch having a first terminal, a second terminal, and a driving terminal, wherein the voltage-building-up capacitor is connected to the first terminal and the second terminal of the second switch; and
a second diode connected to the driving terminal of the second switch to receive the control signal;
the current-sensing module comprises:
a sensing resistor having two terminals, one terminal of the sensing resistor connected to the first terminal of the electronic fuse and the other terminal of the sensing resistor connected to the voltage-building-up resistor of the voltage-building-up module; and
a sensing amplifier configured to receive a voltage difference across the sensing resistor and amplify the voltage difference to output an analog amplified sensing voltage; and
the digital control module comprises:
an analog-to-digital conversion unit configured to receive the analog amplified sensing voltage and convert the analog amplified sensing voltage into a digital amplified sensing voltage; and
a comparison unit configured to receive the digital amplified sensing voltage and a threshold voltage, wherein when the digital amplified sensing voltage is greater than the threshold voltage, the comparison unit is configured to generate the high-level control signal; when the digital amplified sensing voltage is less than or equal to the threshold voltage, the comparison unit is configured to generate the low-level control signal.

11. The method of operating the electronic fuse apparatus in claim 9, wherein when the electronic fuse apparatus is started, the digital control module is configured to generate the low-level control signal to execute the soft start operation and the voltage build-up operation.

12. The method of operating the electronic fuse apparatus in claim 10, wherein when the electronic fuse apparatus is started, the digital control module is configured to generate the low-level control signal to turn off the first switch and the second switch; the first voltage is configured to charge the soft-starting capacitor via a first charging path formed by the soft-starting resistor and the soft-starting capacitor so as to soft start the electronic fuse apparatus;
the second voltage is configured to build up the required voltage when the electronic fuse apparatus is soft started via a second charging path formed by the voltage-building-up resistor and the voltage-building-up capacitor.

13. The method of operating the electronic fuse apparatus in claim 10, wherein when the operating current is over-current, the digital amplified sensing voltage is greater than the threshold voltage so that the comparison unit is configured to generate the high-level control signal to turn on the first switch and the second switch, thus turning off the electronic fuse to provide the over-current protection.

14. The method of operating the electronic fuse apparatus in claim 10, further comprising:
providing a voltage-regulating unit connected between the driving terminal of the short-circuit protection switch and the voltage-building-up module to provide a voltage-regulating protection for the short-circuit protection switch.

15. The method of operating the electronic fuse apparatus in claim 14, wherein when the short-circuit fault occurs at the system side, the voltage-regulation unit is conductive in a reverse biased conduction to turn off the electronic fuse, thus providing a short-circuit isolation protection.

* * * * *